C. & J. KORDEK.
TROLLEY.
APPLICATION FILED SEPT. 1, 1911.
1,010,922.
Patented Dec. 5, 1911.
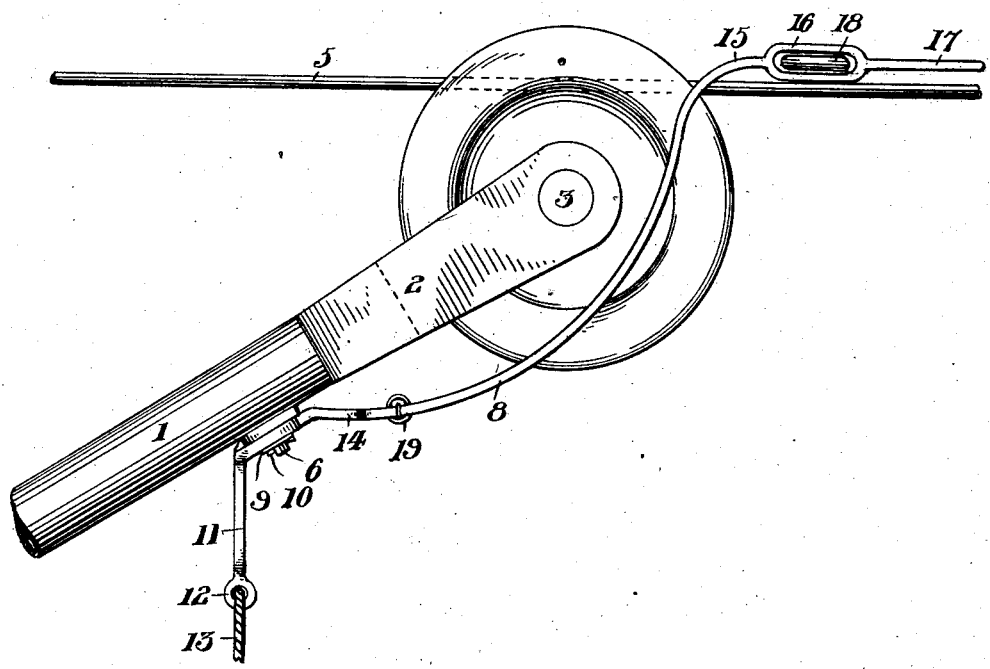
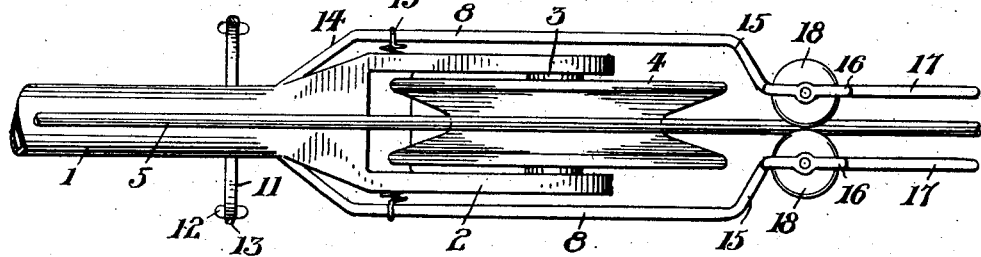
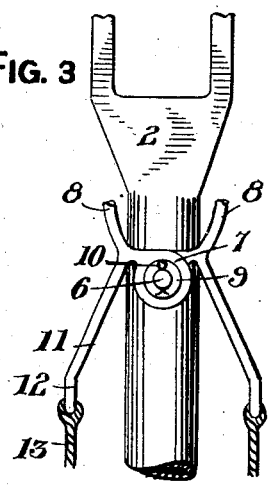
WITNESSES
INVENTORS
C. Kordek and J. Kordek

UNITED STATES PATENT OFFICE.

CYPRIAN KORDEK AND JOSEPH KORDEK, OF PHILADELPHIA, PENNSYLVANIA.

TROLLEY.

1,010,922.  Specification of Letters Patent.  Patented Dec. 5, 1911.

Application filed September 1, 1911. Serial No. 647,135.

*To all whom it may concern:*

Be it known that we, CYPRIAN KORDEK and JOSEPH KORDEK, subjects of the Emperor of Austria-Hungary, residing at Philadelphia, in the county of Philadelphia and State of Pennsylvania, have invented certain new and useful Improvements in Trolleys, of which the following is a specification, reference being had therein to the accompanying drawing.

This invention relates to trolleys, and the objects of our invention are, first, to furnish a trolley pole or harp with simple and effective means, in a manner as will be hereinafter set forth, for preventing a trolley wheel from becoming accidentally displaced from a trolley wire; second, to furnish a trolley harp with guards that will not interfere with the overhead construction of an electric trolley railway system; and third, to provide a trolley attachment that is strong, durable and applicable to various types of poles and harps.

We attain the above objects by a mechanical construction that will be hereinafter specifically described and then claimed.

Reference will now be had to the drawing, wherein—

Figure 1 is a side elevation of a trolley in accordance with this invention; Fig. 2 is a top plan of the same, and Fig. 3 is a bottom plan of a portion of the trolley.

The reference numeral 1 denotes a portion of a trolley pole, having a harp 2 provided with a journal pin or spindle 3 for a revoluble trolley wheel 4 adapted to travel against an electric conductor or trolley wire 5. The under side of the pole 1, contiguous to the harp 2, is provided with a right-angularly disposed pin 6, and movably mounted upon this pin are inwardly projecting apertured bearings 7 of curved arms 8. The inwardly projecting bearings 7 are retained upon the pin 6 by a washer 9 and a cotter pin 10. The curved arms 8 have downwardly flared extensions 11 terminating in eyes 12 to which are connected cables or ropes 13. These cables or ropes can terminate in a single trolley rope adapted to be manipulated by a conductor or operator of a car when it is desired to open or spread apart the arms 8. The curved arms 8 are flared outwardly, as at 14, and they extend upwardly at the sides of the trolley wheel 4, to a point above the harp 2. At this point the arms are bent forwardly and inwardly, as at 15, then upwardly to provide yokes 16, and then forwardly again, as at 17. These forwardly extending ends of the arms facilitate the trolley attachment in entering and passing under a trolley wire frog or guard rail.

Revolubly mounted upon the yokes 16 are rollers 18 that extend in proximity to each other, and at a point above the trolley wire 5. These rollers are adapted to prevent displacement of the trolley wheel 4 relatively to the wire 5. The curved arms 8, at a point below the harp 2 are connected by a coiled retractile spring 19 adapted to normally maintain the rollers in proximity to each other.

The cables 13 are connected in a manner whereby the upper end of the arms 8 can be swung apart to permit of the trolley wheel 4 being quickly removed or placed upon the trolley wheel 5.

The trolley attachment in its entirety can be made of light and durable metal, and of various sizes.

What we claim is:

The combination with a trolley pole, a harp carried thereby, and a wheel revolubly supported by said harp and adapted to travel against a trolley wire, of a pin carried by said pole adjacent to said harp, curved arms having inwardly projecting bearings loosely mounted upon said pin, said arms having depending flared extensions terminating in eyes adapted to be connected to cables, said curved arms having the upper ends thereof bent forwardly and upwardly, providing yokes, rollers revolubly mounted upon the yokes of said arms in proximity to said trolley wire, and a coiled retractile spring connecting said arms at a point below said harp.

In testimony whereof we affix our signatures in the presence of two witnesses.

CYPRIAN KORDEK.
JOSEPH KORDEK.

Witnesses:
NELLIE M. DONOHOE,
PHILIP DONOHOE.

*Copies of this patent may be obtained for five cents each, by addressing the "Commissioner of Patents, Washington, D. C."*